Figure 1:
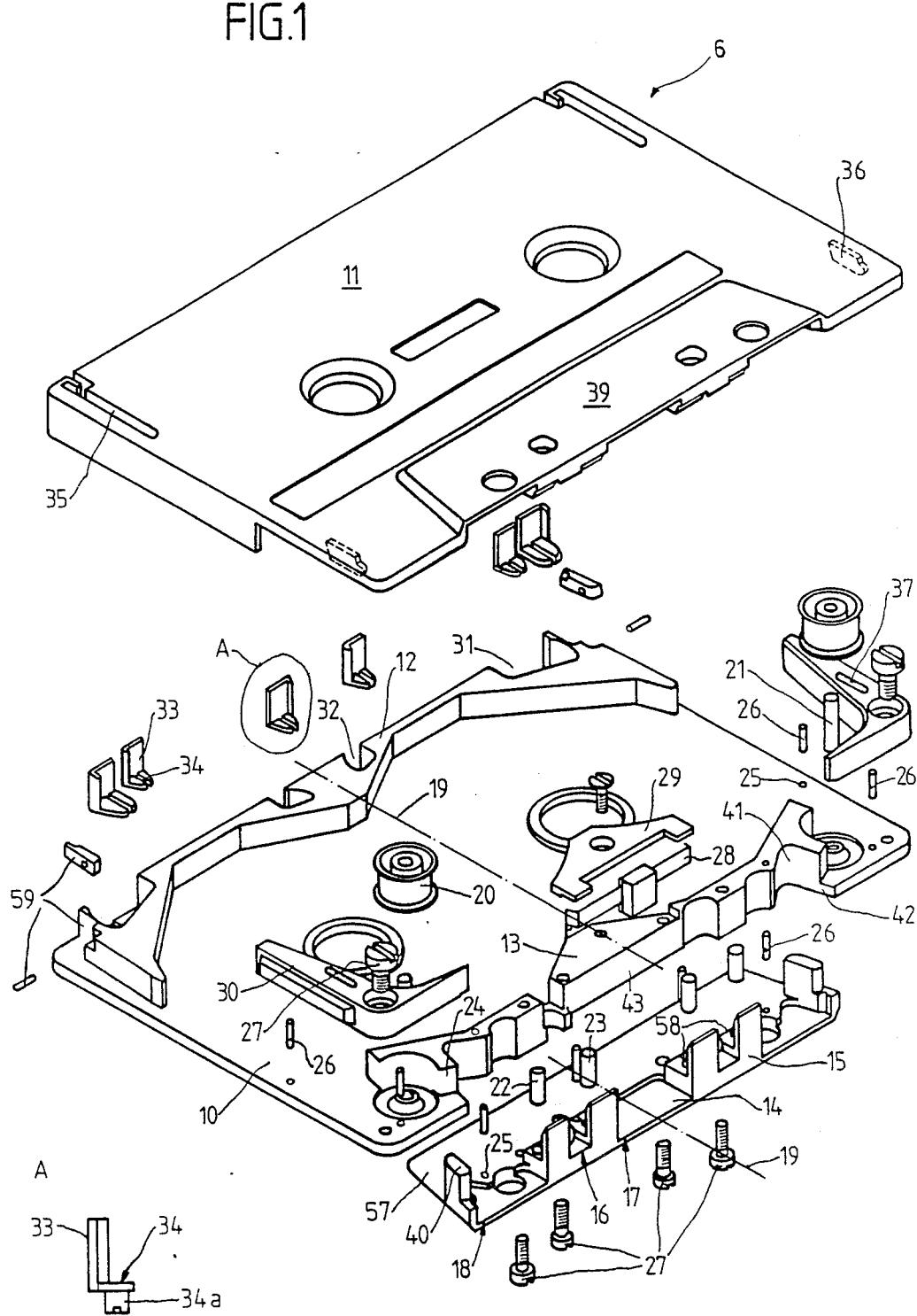

United States Patent [19]

Hoffrichter et al.

[11] Patent Number: 4,964,588
[45] Date of Patent: * Oct. 23, 1990

[54] RIGHT PARALLELEPIPED CASSETTE FOR TAPE-LIKE RECORDING MEDIA, AND HOUSING PART THEREOF

[75] Inventors: Bernd Hoffrichter, Appenweier; Bozidar Pavelka, Willstaett; Dietmar Pfefferkorn, Hemsbach; Norbert Schaeffer, Deidesheim; Klaus Goetz, Neustadt, all of Fed. Rep. of Germany

[73] Assignee: BASF Aktiengesellschaft, Ludwigshafen, Fed. Rep. of Germany

[ * ] Notice: The portion of the term of this patent subsequent to Mar. 7, 2006 has been disclaimed.

[21] Appl. No.: 272,785

[22] Filed: Nov. 18, 1988

Related U.S. Application Data

[62] Division of Ser. No. 82,143, Aug. 6, 1987, Pat. No. 4,809,928.

[30] Foreign Application Priority Data

Aug. 16, 1986 [DE] Fed. Rep. of Germany ... 8621947[U]

[51] Int. Cl.$^5$ ............................................. G11B 23/87
[52] U.S. Cl. ................................................... 242/199
[58] Field of Search ............................... 242/197–199; 360/130

[56] References Cited

U.S. PATENT DOCUMENTS

| | | | |
|---|---|---|---|
| 3,796,394 | 3/1974 | Souza | 242/199 |
| 3,934,842 | 1/1976 | Posso | 242/199 |
| 4,093,967 | 6/1978 | Satou et al. | 242/199 X |
| 4,166,593 | 9/1979 | Milants | 242/199 |
| 4,387,823 | 6/1983 | Shiba | 242/199 X |
| 4,545,500 | 10/1985 | Yamaguchi et al. | 242/199 X |
| 4,570,877 | 2/1986 | Oishi et al. | 242/199 |
| 4,633,354 | 12/1986 | Oishi et al. | 242/198 X |
| 4,689,702 | 8/1987 | Oishi et al. | 242/199 X |
| 4,809,928 | 3/1989 | Hoffrichter et al. | 242/199 |

FOREIGN PATENT DOCUMENTS 2126561 3/1984 United Kingdom .

*Primary Examiner*—Daniel P. Stodola
*Assistant Examiner*—Willaim G. Battista, Jr.
*Attorney, Agent, or Firm*—Keil & Weinkauf

[57] ABSTRACT

A right parallelepiped cassette is provided with a guide insert as a separate housing part which can be produced and machined separately and very precisely, contains important guide elements of the cassette and can be oriented in a predetermined manner on reference surfaces of the remainder of the cassette housing and fastened thereon. In a particular embodiment, the cassette contains detachably fastened spacing elements for measuring the alignment of the guide elements. The cassette can advantageously be used for any type of recording media in tape or strip form.

4 Claims, 6 Drawing Sheets

RIGHT PARALLELEPIPED CASSETTE FOR TAPE-LIKE RECORDING MEDIA, AND HOUSING PART THEREOF

This is a continuation of application Ser. No. 07/082,143, filed Aug. 6, 1987, and, now U.S. Pat. No. 4,809,928 issued Mar. 7, 1989.

The present invention relates to a right parallelepiped cassette for tape-like recording media, consisting of base and lid walls and front, rear and side walls which enclose one or more rotatable reels and a tape-like recording medium, the front, rear and side walls being partly or completely in the form of spacing elements between the base and lid walls and being fastened as such, and one or more housing parts having openings to permit elements of the apparatus access to the recording medium and guide elements and/or alignment elements for the recording medium being arranged in the proximity of this housing part, and a housing part for the cassette housing.

German Laid-Open Applications DOS 3.019,442 and DOS 3,111,304 disclose compact cassettes whose housings consist of frame-like intermediate parts having relatively shallow base and lid parts. Parts of the intermediate frame are in the form of tape guide elements. Intermediate frames of this type consist of cast metal meterial or composite resin material with glass fiber reinforcement. High requirements in respect of alignment and low tolerances of the guides elements cannot be met in this way.

German Laid-Open Application DOS 2,348,994 discloses a compact cassette in which tape guidance is effected by means of a separate guide element which is positioned between the halves of the housing shell by projecting elements and held by the lid. The actual guide elements are special sliding surfaces on parts of the guide element, which consists of polyacetyl resin which may or may not be reinforced with glass fibers. The material should be abrasion-resistant and have a low coefficient of friction. The accuracy of the position and form of the actual guide elements cannot be increased in this way.

Furthermore, German Laid-Open Application DOS 2,707,804 discloses that a separate tape guide unit which also comprises the tape guide rolls of a compact cassette can be inserted between the halves of the housing in such a way that the stresses and distortions and the warping of the individual plastic parts are compensated. Although the vertical tape running tolerances are restricted by webs on the insides of the halves of the housing, the position and the form of the individual guide elements are not improved.

Furthermore, German Utility Model 8222016 discloses that a magnetic tape cassette can be provided with tape guide elements which can be adjusted by means of adjusting apparatuses acting exclusively in a plane at right angles to a reference plane. Although this permits momentary compensation of cassette or tape tolerances, the guide elements cannot be fixed in an ideal position, and displacement from a set position cannot be prevented.

It is an object of the present invention to improve a right parallelepiped cassette for tape-like recording media compared with the prior art.

We have found that this object is achieved if, in a right parallelepiped cassette as defined in the introduction, the housing part with the openings is in the form of a separate part and is designed to hold one or more parts of the guide and alignment elements, and the base wall or lid wall has a reference surface on which the housing part can be fastened. Consequently, by providing the separate housing part, in particular that region of a cassette housing which has the greatest effect on the recording and playback operation can be produced separately and thus particularly precisely and can nevertheless be mounted on the remaining housing in a predetermined position. The housing part which is particularly suitable in each case, in particular the front part, is chosen so that either, in conventional compact cassettes, the openings in the front wall itself are of a predetermined size and position with respect to the heads or, as in commercial video cassettes, the lower (or upper) edge of the housing is used for aligning the cassette on this side, and consequently a reference position of the housing is obtained for pulling out the recording tape and after the latter has been pulled out.

The cassette according to the invention ensures ideal tape guidance relative to the cassette housing and makes it possible to exclude recording and playback errors due to incorrect spatial arrangement of the housing and guide or alignment elements.

In another embodiment, the separate housing part is provided with locating holes for holding locating pins as guide elements for the recording medium.

Thus, in the production process, the guide and alignment elements can be inserted prior to assembly with the remainder of the cassette housing, and the completed separate housing part can be combined as a whole with the remainder of the housing in a simple manner, facilitating manufacture and assembly.

Advantageously, the guide and alignment elements on the separate housing part are separated by means of a spacing element from the interior of the cassette. consequently, mounting and alignment of the spacing element can be carried out extremely precisely, thus likewise improving and making more precise its guidance and alignment function, which is at least an indirect one.

In another practical embodiment, the spacing element can also be fastened directly to the base of lid wall of the housing having the reference surface. The spacing element can of course also be fastened to the separate housing part itself if the latter is designed for this purpose.

In another embodiment of the novel cassette, where the latter contains two coplanar reels, the separate housing part can include the central piece of the front wall. This reduces the separate housing part to the cassette area, which is most important in this case. It is advantageous in practice if the housing part is provided not only with a first part of a wall having openings but also with a second wall part which partly replaces or covers the base and/or lid wall possessing the reference surface.

In an embodiment which is advantageous from the point of view of production, the spacing element may be provided with inserted guide elements, in particular consisting of steel. In another advantageous embodiment, spacing elements detachably fastened in the proximity of guide elements can be provided on one or more of the base or lid walls, for gaging or checking the position of the said elements, with the result that gaging/checking can be carried out readily even after the lid wall has been mounted. In advantageous embodiments, these detachable spacing elements are corner parts which cover guide and alignment elements having a tape guide function on the outside. In another embodiment, the spacing elements can be arranged on the sides of the housing and extend around the front and fear corners of the right parallelepiped cassette.

It is also advantageous to provide locating holes and pins by means of which in particular the housing part and spacing element can be aligned relative to the base walls and/or lid walls of the cassette. This ensures exact correspondence.

It is also advantageous if the housing part comprises at least one part of the cassette, in particular a raised outer part, part or all of which forms a reference region for the associated cassette recorder. In the compact cassette, the raised head entry region of the cassette housing can advantageously be used for this purpose.

For extreme precision requirements, it is advantageous to provide a single housing part which has guide and alignment elements and is arranged so that the cassette can be used only with one of the base of lid walls being supported or adjacent.

The invention is described in detail below and illustrated by embodiments shown in the drawing.

Figure 1A:
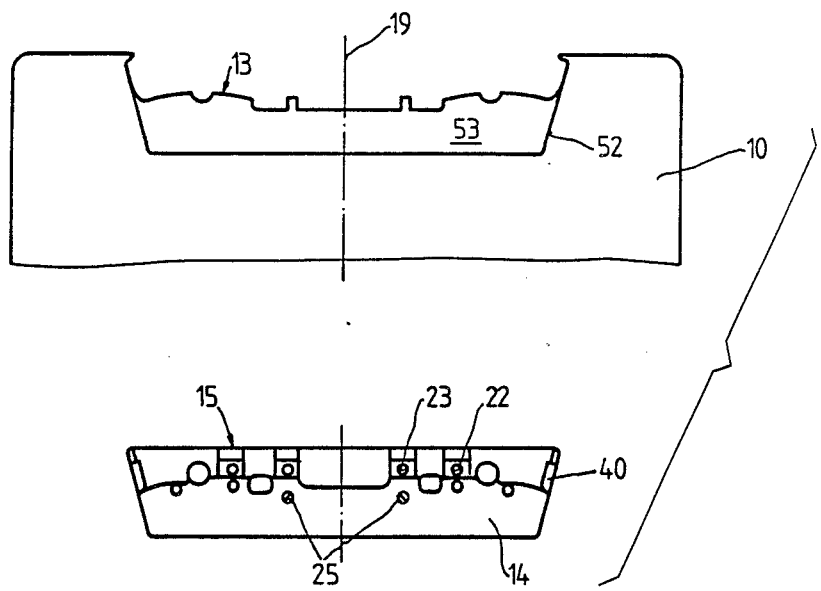
Figure 7:
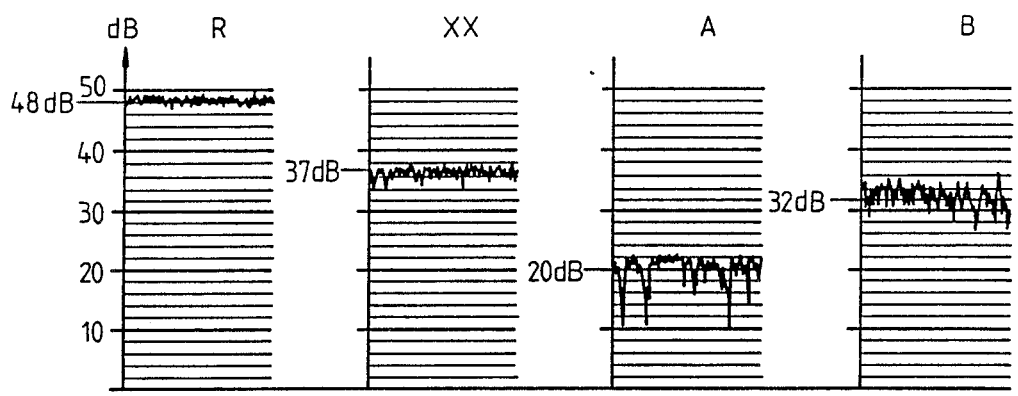
Figure 2:
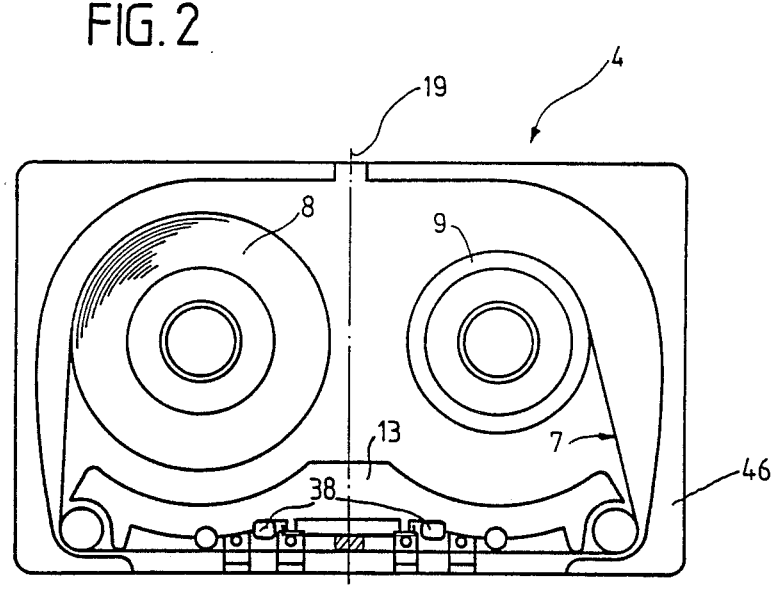
Figure 3:
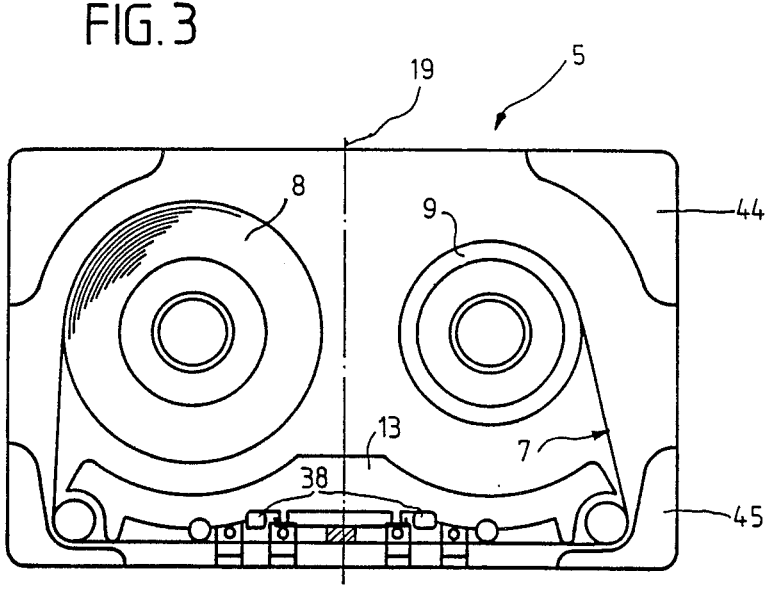
Figure 4:
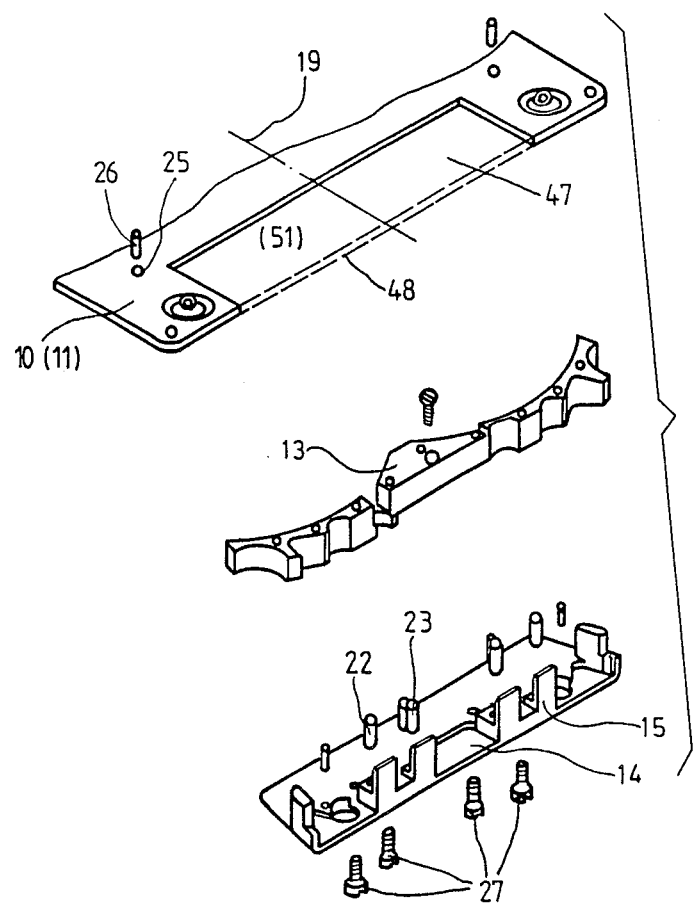
Figure 5:
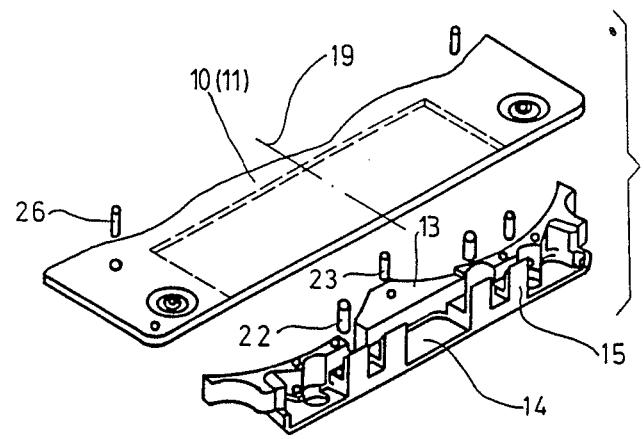
Figure 6:
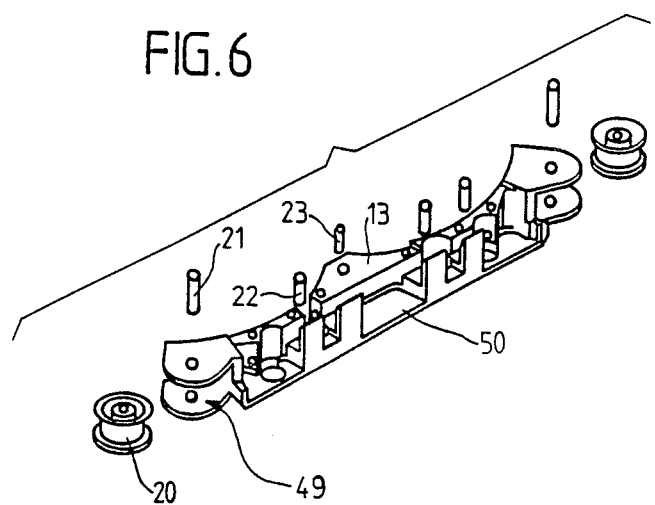

In the drawing,

FIG. 1 shows an exploded view of a compact cassette according to the invention,

FIg. 1A shows a part view of the base wall from below and a plan view of an associated guide insert, FIGS. 2 and 3 show schematic representations of spacing elements within contours of the cassette housing, FIG. 4 is a perspective view of a part of a base or lid wall of a cassette, a spacing element and a separate wall part, FIG. 5 shows a part of a base or lid wall and a separate housing part having an integral spacing element, FIG. 6 shows a separate housing part having a spacing element and integral guide rolls and FIG. 7 shows noise measurement graphs.

FIG. 1 shows a compact cassette 6 (for coplanar reels 8 and 9 not shown here and a magnetic tape 7), having a roughly right parallelepiped housing consisting of a baseplate 10, a lid plate 11, a rear spacing element, referred to briefly as rear element 12, a front spacing element, referred to briefly as front element 13, a housing part 14, a central piece of the front wall 15 having entrance and exit openings 16 to 18 which are symmetrical with respect to the central line 19, and the guide rolls 20 with axles 21. Guide and alignment pins 22 and 23 in locating holes 58, and guide and alignment edges 24 on front element 13, are provided, likewise symmetrical to line 19. They will be referred to below as guide pins, guide edges etc. The parts 10, 13 and 14 are aligned very exactly with respect to one another by means of locating holes 25 and locating pins 26 and are connected firmly to one another by means of screws 27 (and corresponding threaded holes). A pressure spring 28 with holding plate 29 can be fastened in the middle of front element 13. The housing part 14 is referred to below as guide insert Spacing elements, corner elements 30, are roughly L-shaped and extend around the front corners of the housing and can be detachably fastened to the baseplate 10 by means of screws 27. Recesses 31 and 32 are provided at the back of rear element 12, once again arranged in pairs symmetrically with respect to central line 19.

Erase, tape type and other functions can be set as desired by means of adjusting elements 33 having an L-shaped cross-section, a slotted bearing pin 34a and an actuating slot 34. The lid plate 11 possesses, at the rear end, clamping slots 35 and the rear element 12 possesses corresponding counter-means 59 for screw-free closure of the housing. Furthermore, internal webs on lid plate 11 interact with slots 37 in the corner elements 30 to connect housing parts 10 and 11 detachably. Of course, the base and lid plates 10 and 11 can also be connected in a conventional manner by means of screws. The intention is merely to ensure that the cassette can easily be opened even by amateurs and the tape changed, for example in order to alter the tape type (iron oxide, chromium dioxide, metal pigment or metal layer tape, and if necessary also reference tapes in each case).

The other individual parts and the shape of the compact cassette conform to IEC standard 94-7, 1985, which is decisive. It should also be pointed out that the rear edges of the roughly rectangular recesses 38 (symmetrical with respect to line 19 in FIGS. 2 and 3) constitute a reference line for aligning the cassette with respect to the apparatus.

The standardized, raised lid region 39 at the front of the lid plate 11 can be used as a contour for the central piece or guide insert 14 (cf. for example base part 57 in FIG. 1). Provided that the standardized shape of the compact casssette is retained or the casssette is another type of recording cassette, for example film, video or data cassette or any tape or strip cassette, it is also possible to choose a different shape for the guide insert.

In the example described, the baseplate 10 forms the connection to the recorder and acts as a reference plane for the cassette. The baseplate 10 should therefore consist of material which as far as possible is stress-free, temperature-independent and resistant to distortion (as listed below) and should be capable of being processed very precisely to give an even product. Reference surfaces should be provided in particular for fastening the guide insert 14, in the present case in FIG. 1, for example, the undersides of front element 13 and possibly adjacent parts of the base wall 10. FIG. 1A shows part of the base wall 10 from below, a roughly trapezoidal depression being provided within the contour of the raised region (designated by 39 on top of the lid part). The edge 52 as well as the surface 53 of the depression can be used as reference surfaces for the correspondingly shaped guide insert 14. A depression whose surface 53 should be produced with twice the levelness tolerance, as for the system reference regions of the outer surface of the baseplate, is not required for ensuring sufficiently accurate alignment of the guide insert 14 and the base wall, this accuracy being achievable with locating elements 26, 25 alone. As shown in FIG. 1, some of the most important guide elements (22, 23) can be mounted on guide insert 14, since these elements are arranged in the direct vicinity of the head entrance 17 and hence predominantly determine the tape/head correspondence.

The height of the surface of guide insert 14 with respect to the other cassette dimensions is standardized so that the height dimensions are above all kept independent of the material. The under-surface of guide insert 14 must, moreover, be parallel to the large outer surface of the baseplate 10 and must be arranged parallel to the said outer surface. The guide elements on guide insert 14 are, in addition to the guide pins 22 and 23, the stationary webs 40, which are arranged symmetrically with respect to line 19 but may also be formed or mounted directly on baseplate 10.

As described above, in FIG. 1 the front element 13 either forms a single piece together with the baseplate 10 or can be fastened on the latter in a predetermined position and manner so that the said element itself can be used as a reference element, as described in the present example. In this case, the surfaces 41 on front element 13 serve as reference surfaces for the outer surfaces of the webs 40. Furthermore, the inner edges 42 of the cut-out in baseplate 10 and the lower surfaces 43 of the front element form reference surfaces for the guide insert 14.

The abovementioned locating pins 26 and locating holes 25 serve as very precise means for aligning the front element 13 with respect to the baseplate 10, or the guide insert with respect to the first two parts. The guide pins 22 and 23 themselves and the corner elements 30 can also be optimally aligned by means of the same locating elements. The actual fastening is then affected by means of screw connections 27. Very precise alignment with a deviation of only a few $\mu$m over the height of 3.81 mm is desirable, and is achieved in practice.

While guide pins 22 and 23 are, if need be, remeasurable through the openings 16 to 18 in the front wall, axles 21 of guide rolls 20 are no longer accessible after the housing has been assembled. To overcome this disadvantage, either the corner elements 30 can very advantageously be partly or completely accessible through openings which may be provided with covers, or may be visually observable through sufficiently transparent material in the form of windows, for example for optical alignment measurements, photographs, etc., or, as mentioned above, the corner elements are removable and can be inserted and fastened in the otherwise already assembled housing after the measurements have been made.

FIGS. 2 and 3 show further schematic embodiments of cassettes (4, 5) having two coplanar reels and corner elements. In FIG. 3, four corner elements 44, 45 are provided, these elements being roughly similar in shape to the front corner elements 30.

In FIG. 2, the spacing elements 46 provided are arranged on two opposite sides of the housing and around the front and rear corners of the housing. Advantageously, all elements 44–46 are detachably fastened to the base or lid part 10 and 11, respectively, by aligning means, for example locating pins 26 and screws 27 or equivalent fastening means, unless, as stated above, they are provided with windows or consist of transparent material.

FIG. 4 shows, once again as a schematic detailed representation, that the baseplate 10 can be provided with a rectangular cut-out 47, which can be matched exactly with the contour of the guide insert 14, and the front element 13 with its own alignment and fastening elements can be provided on the base part 10.

The dashed front edge 48 of the baseplate 10 furthermore indicates the possibility of mounting the guide insert 14 on a reference surface (51) of the base or lid part, the said reference surface not being cut out, and of aligning and suitably fastening the said insert thereon by means of locating elements (cf. FIG. 5). the dimensions would then have to correspond to the standard, and the base or lid part would then have to be provided with appropriate raised areas.

In FIG. 5, the front element 13 is already mounted on the guide insert 14, for example aligned by means of locating pins 26, or is structurally completely integrated, for example by producing the components as a single piece and then carrying out fine machining and, if required, very fine machining.

FIG. 6 shows another embodiment of a guide insert 50 having intregral guide rolls 20 and axles 21. Holders 49 make the guide rolls 20 completely independent of the housing. Although a guide insert in the form of a single unit has been described above, an embodiment consisting of a plurality of parts is also possible.

A suitable material which can be subjected to fine and very fine machining, for example brass, steel, hard metal alloys, ceramic, sintered materials, glass materials, very strong plastics (for example with a high glass fiber content, etc.), is important with regard to the subject of the invention.

Compared to compact cassettes of high quality, the following results are obtained with a precision cassette according to the present invention, in which the guide elements have a precision of $\leq \pm 5$ $\mu$m over an effective guide length of 3.81 mm with respect to their inclination to the reference surface, and a conicity of less than $\pm 5$ $\mu$m, and the eccentricity of guide rolls is less than or equal to 10 $\mu$m.

Three dilfferent measurements were carried out:

(1) Wow and flutter measurement using a recorder (R 1) from Onkyo, type TA 2022, and a recorder (R 2) from Pineer, type CT 740.

(2) Phase error measurements on a Nakamichi 700 apparatus from Nakamichi.

(3) Noise measurement during operation, using a measuring recorded from Revox (B 710) and a measuring set-up essentially consisting of a precision microphone and a level recorder from Bruel & Kjaer, Copenhagen (type 2305), evaluated using the noise curve filter and noise control curve according to DIN (IEC 651).

The abovementioned precision cassette was compared with a high quality compact cassette having a closed metal frame (A) and plastic lid and base parts, and with a compact cassette having an open metal frame and a plastic front part having metal guide pins and bearing pins and plastic guide rolls (B) (neither of the comparison cassettes was produced by the applicant).

RESULTS

Wow and Flutter Measurements

|    | Recorder R1 | | Recorder R2 | |
|----|------|------|------|------|
|    | E1   | E2   | E1   | E2   |
| A  | 0.33 | 0.42 | 0.37 | 0.80 |
| B  | 0.30 | 0.43 | 0.38 | 0.42 |
| XX | 0.26 | 0.31 | 0.28 | 0.39 |

E1 = Mean value of noise level over the total number of measured values
E2 = Mean value of the 10 largest noise levels.
(The stated mean values are unweighted.)
Total number of measured values: 200.

This shows that the wow and flutter is reduced by 21–26% for recorder R1 and by 9–51% for recorder R2.

2. Phase Comparisons

The measurements were carried out with a reference signal of 10 kHz, the following results being obtained:

|    | Side A | Side B |
|----|--------|--------|
| A  | −130°  | − 80°  |
| B  | +160°  | +150°  |
| XX | 0°     | not applicable, since only |

| Side A | Side B |
| --- | --- |
| | one operating position |

Thus, a novel precision cassette which can be operated in one position completely eliminates any phase errors.

3. Noise Measurement

The noise measurement graphs in FIG. 7 show the noises for cassettes A, B and XX next to one another, with the noise of the measuring system at rest shown as a comparison measurement.

The comparison cassettes have a substantially larger noise signal amplitude as well as a poorer signal-to-noise ratio (substantially in the case of A), the diffference ranging from an minimum of 6 dB (cassette B) to a maximum of 17 dB (cassette A) with a comparison ratio of about 48 dB for the signal-to-noise ratio of the measuring system at rest.

The novel precision cassette thus has a substantially lower noise level and, because of the considerably lower amplitude, also a very mush smaller degree of perception for the human ear in comparison with the most similar cassettes available on the market.

We claim:

1. A right parallelepiped cassette for a tape-like recording medium which is wound on or unwound from at least one rotatable reel, said cassette being designed to be placed in cooperative relationship with a tape transport apparatus and comprising:
   housing parts including base and lid walls and front, rear and side walls which enclose said rotatable reel and said tape-like recording medium, the front, rear and side walls being at least partly in the form of spacing elements between the base and lid walls and being fastened as such,
   at least one housing part having openings to permit elements of the apparatus access to the recording medium, and
   guide and alignment elements for the recording medium which are arranged at least in the proximity of said housing part,
   wherein the housing part with the openings is in the form of a separate part extending along the front wall only of the cassette and holds one or more of the guide and alignment elements, and the base wall or lid wall has at least one reference surface on which the housing part can be fastened.

2. A cassette as claimed in claim 1, wherein the housing part is provided with locating holes for holding locating pins, said locating pins forming part of the guide elements for the recording medium.

3. A cassette as claimed in claim 1, wherein the guide and alignment elements on the separate housing part are separated by means of a spacing element from the interior of the cassette.

4. A cassette as claimed in claim 1, wherein locating holes and pins are provided, by means of which the separate housing part and the spacing elements can be aligned and fastened relative to one of the base wall and lid wall of the cassette.

* * * * *